United States Patent [11] 3,587,658

[72] Inventor Charles M. Giltner
 North Wales, Pa.
[21] Appl. No. 770,361
[22] Filed Oct. 24, 1968
[45] Patented June 28, 1971
[73] Assignee Ametek, Inc.
 New York, N.Y.
 Continuation-in-part of application Ser. No.
 499,580, Oct. 21, 1965, now Patent No.
 3,467,329.

[54] SELF-ERECTING SPIRAL TUBE DEVICE
 4 Claims, 4 Drawing Figs.
[52] U.S. Cl..................................................... 138/154,
 138/134, 138/178, 138/109
[51] Int. Cl..................................................... F16l 9/16

[50] Field of Search........................................... 138/129,
 134, 150, 154, 178, 109 (Cursory), 177(Cursory);
 267/(Considered); 185/(Considered)

[56] References Cited
 UNITED STATES PATENTS
 2,316,349 4/1943 McMinn...................... 138/154
 FOREIGN PATENTS
 19,731 1890 Great Britain................ 138/134
 691,259 5/1953 Great Britain................ 138/150
 10,516 1/1899 Sweden....................... 138/154

Primary Examiner—Herbert F. Ross
Attorney—Busser, Smith & Harding

ABSTRACT: A tube comprises a helical axially extending ribbon of spring material which has adjacent turns set to coil tightly in overlapping and telescoping engagement.

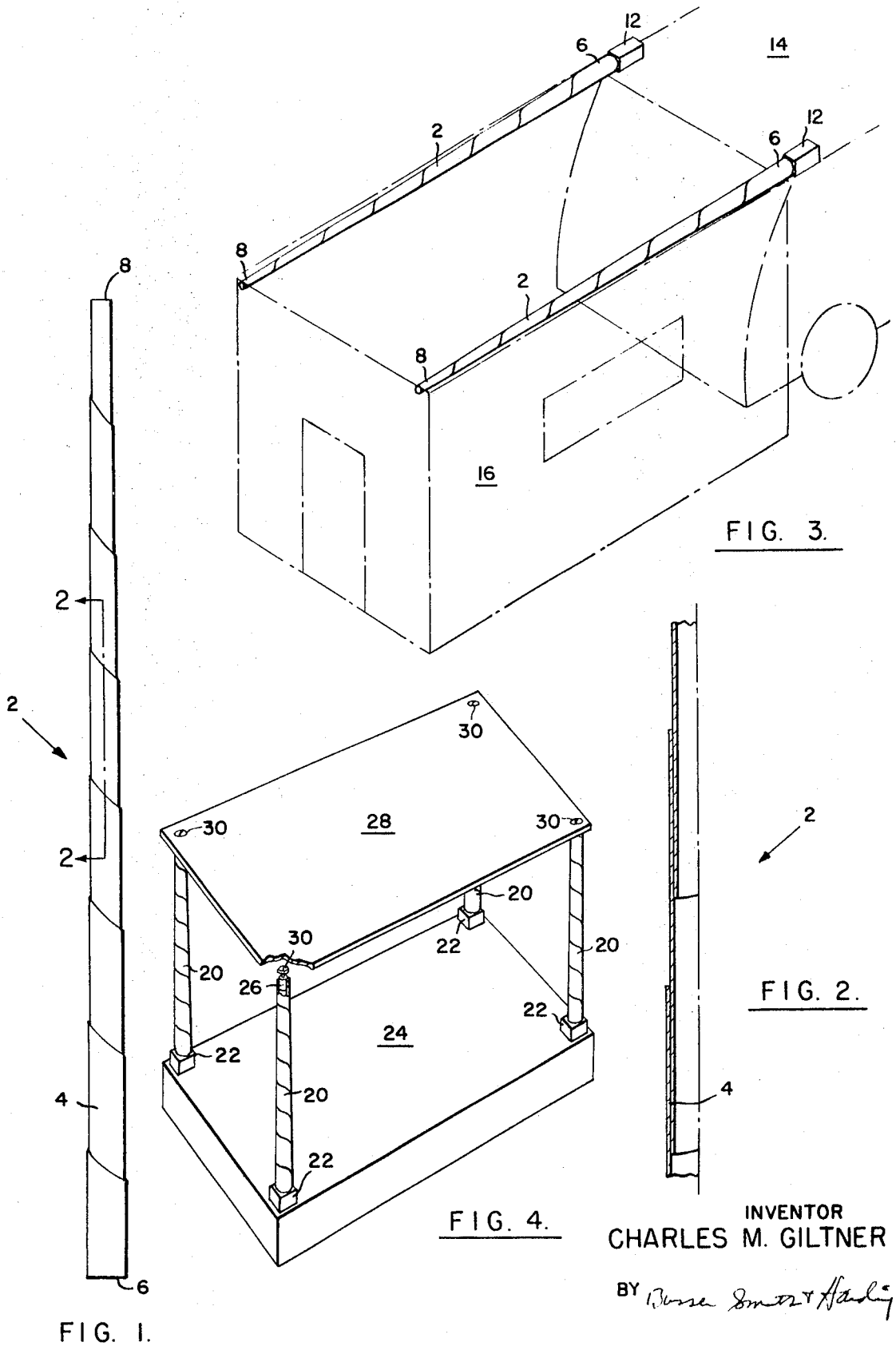

3,587,658

SELF-ERECTING SPIRAL TUBE DEVICE

CROSS-REFERENCE TO RELATED APPLICATION

This application is a continuation-in-part of my earlier filed U.S. Pat. application Ser. No. 499,580 filed Oct. 21, 1965, which is now U.S. Pat. No. 3,467,329.

BACKGROUND OF THE INVENTION

The tube of this invention is highly advantageous as contrasted to the best known prior art tubes, which are seamless tubes, in that, for a given thickness of material and a given outside dimension, the tube of the invention exhibits substantially greater stiffness and a markedly higher bending failure load capability. Further, the tube of the invention gives superior performance in axial loading, either in tension or compression, in that it is "fail-safe" since a load greatly in excess of its nominal design load will not damage it, but will rather elongate or compress the tube in a manner so that removal of the excess load will permit the tube to restore itself to nominal length and nominal load bearing performance. Further, the tube of the invention is advantageous in that it can be compressed for storage in a very small space. When a spring metal is employed, the construction of the tube permits the employment of material having a much higher yield strength than is available in materials used for forming seamless tubes, for example, a yield of 260,000 p.s.i. as against 160,000 p.s.i.

SUMMARY OF THE INVENTION

The tube of the invention has a helical axially extending ribbon of spring material having adjacent turns set to coil in tight overlapping and telescoping engagement.

It is preferred to use a ribbon of metal, advantageously, spring steel. However, for many purposes a plastic (synthetic resin) such as for example a resilient phenolic or polyester resin may be employed.

DESCRIPTION OF THE DRAWINGS

FIG. 1 is an elevational view of a tube in accordance with the invention;

FIG. 2 is an enlarged vertical section, partially broken away, taken on the plane indicated by the line 2–2 in FIG. 1;

FIG. 3 is a top perspective view showing the employment of tubes in accordance with the invention laterally loaded, and FIG. 4 is a top perspective, partially broken away, showing the employment of tubes of the invention axially loaded.

PREFERRED EMBODIMENT

A tube 2 in accordance with the invention has a ribbon 4 of spring material set to coil in tight overlapping and telescoping engagement. The tube is readily formed by employing the method of U.S. Pat. No. 3,007,239 issued Nov. 7, 1961, with the exception that in lieu of setting the ribbon to coil in a cylindrical coil, the ribbon is set with a helix angle so that the ribbon will naturally coil into a helical coil to form the tube in the invention. For simplicity of manufacture, each increment of the ribbon may be set to the same radius although varying radii, such as increasing or decreasing radii, may be used so long as the adjacent coils are in tight contact. In making the tube the ribbon is formed to introduce residual compressive and tensile stresses which resist the straightening of the coils. These residual stresses markedly increase the stiffness and bending failure load capability of the tube.

It is to be understood that the term "helical" as used in the specification and claims is used in the mathematical sense to define a ribbon which is set to coil so that the coils advance in the direction of the axis of the tube when they are in their free state.

I claim:
1. A bend resistant collapsible tube comprising:
    a helical axially extending ribbon of spring material having adjacent turns stressed to coil in tight overlapping and telescoping engagement, said ribbon being reverse stressed to resist straightening.
2. A tube in accordance with claim 1 in which the spring material is steel.
3. A tube in accordance with claim 2 in which the ribbon has residual compressive and tensile stresses resisting the straightening of the coils.
4. A tube in accordance with claim 1 having one end thereof mounted in a socket member.